(12) United States Patent
Oliver (10) Patent No.: US 8,879,889 B2
(45) Date of Patent: Nov. 4, 2014

(54) CLOSED CAPTIONING CONTENT BASED DIGITAL VIDEO RECORDING SYSTEMS AND METHODS

(75) Inventor: Michael R. Oliver, Hoboken, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 71 days.

(21) Appl. No.: 13/284,048

(22) Filed: Oct. 28, 2011

(65) Prior Publication Data

US 2013/0108242 A1    May 2, 2013

(51) Int. Cl.
*H04N 5/92* (2006.01)
*H04N 5/781* (2006.01)
*H04N 7/088* (2006.01)
*H04N 21/488* (2011.01)

(52) U.S. Cl.
CPC ................. *H04N 5/781* (2013.01); *H04N 5/92* (2013.01); *H04N 7/0885* (2013.01); *H04N 21/4884* (2013.01)

USPC .......................................................... 386/244

(58) Field of Classification Search
CPC ..... H04N 5/85; H04N 9/8042; G11B 27/105; G11B 27/329; G11B 2220/2562
See application file for complete search history.

(56) References Cited

U.S. PATENT DOCUMENTS

| 2007/0188902 | A1* | 8/2007 | Patron et al. ..................... 360/31 |
| 2011/0292280 | A1* | 12/2011 | Sloo .............................. 348/465 |
| 2012/0047534 | A1* | 2/2012 | Gharachorloo et al. ........ 725/53 |

\* cited by examiner

*Primary Examiner* — William C Vaughn, Jr.
*Assistant Examiner* — Daniel Tekle (57) ABSTRACT

An exemplary method includes a digital video recording system receiving input representative of one or more keywords from a user of a media content service, detecting the one or more keywords within closed captioning content associated with a media content instance available for access by the user by way of the media content service, and performing, in response to the detecting, one or more recording operations with respect to the media content instance. Corresponding methods and systems are also disclosed.

23 Claims, 10 Drawing Sheets

CLOSED CAPTIONING CONTENT BASED DIGITAL VIDEO RECORDING SYSTEMS AND METHODS

BACKGROUND INFORMATION

Set-top box devices and other media content processing devices are often configured to provide users with access to a large number and variety of media content choices. For example, a user may choose to experience a variety of broadcast television programs, pay-per-view services, video-on-demand programming, Internet services, and audio programming via a set-top box device. Certain media content processing devices include and/or are configured to operate in conjunction with a digital video recording ("DVR") service (e.g., a DVR application). In general, DVR services allow a user to record and then view or otherwise experience recorded media content. For example, a user may use a DVR service to schedule a recording of a particular television program, after which the DVR service may record the television program and allow the user to play back a presentation of the recorded television program in a time-shifted manner.

However, as media content providers have expanded and continue to expand the media content choices available to users by way of set-top box devices and other types of media content processing devices, it has become more difficult for DVR users to locate media content that actually interests the user. For example, a DVR user may have access to hundreds or even thousands of channels by way of a set-top box device, but be interested in recording only a small fraction of the media content programs offered by way of these channels. Locating and scheduling these media content programs for recording by a DVR service can be cumbersome and time-consuming for the user, and can often lead to missed viewing opportunities.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Closed captioning content based digital video recording ("DVR") systems and methods are described herein. As will be described below, a DVR system may receive input representative of one or more keywords from a user of a media content service, detect the one or more keywords within closed captioning content associated with a media content instance available for access by the user by way of the media content service, and, in response, perform one or more recording operations with respect to the media content instance.

As used herein, the terms "media content" and "media content instance" may refer to any media content program, television program, on-demand media program, pay-per-view media program, broadcast media program (e.g., broadcast television program), multicast media program (e.g., multicast television program), narrowcast media program (e.g., narrowcast video-on-demand program), IPTV media content, advertisement, video, movie, audio program, radio program, or any segment, component, or combination of these or other forms of media content that a user may access by way of a media content processing device.

As used herein, a "media content service" may refer to any service configured to provide a user with access to media content. For example, a media content service may include a subscriber television service (e.g., a cable, fiber optic, and/or satellite television service), an Internet-based media content service (e.g., an Internet-based streaming video service and/or a streaming music service), and/or any other type of service as may serve a particular implementation.

By identifying user input keywords included in closed captioning content, the systems and methods described herein may provide a more efficient and effective media content recording experience for a user. For example, the methods and systems described herein may automatically identify and record media content that mentions, in closed captioning content, one or more keywords provided by the user. This may be useful when the one or more keywords are not included in the title of a media content instance and/or in any other metadata associated with the media content instance.

To illustrate, a user may be interested in recording media content related to a trending event (e.g., a news event). It may be difficult for the user to know or predict which media content programs available by way of a media content processing device are going to discuss the trending event or be otherwise related to the trending event. However, in accordance with the methods and systems described herein, the user may simply provide one or more keywords describing the event (e.g., "Cowboys" and "football"). The methods and systems described herein may then monitor a plurality of closed captioning feeds (e.g., by monitoring a plurality of closed captioning streams as they are being processed by one or more computing devices associated with a service provider) associated with a plurality of media content instances available for access by the user by way of a media content service for an occurrence of the one or more keywords. When a particular closed captioning feed is identified as including the one or more keywords, the methods and systems may automatically record at least a portion of the media content instance that corresponds to the identified closed captioning feed for future access by the user.

Figure 1:
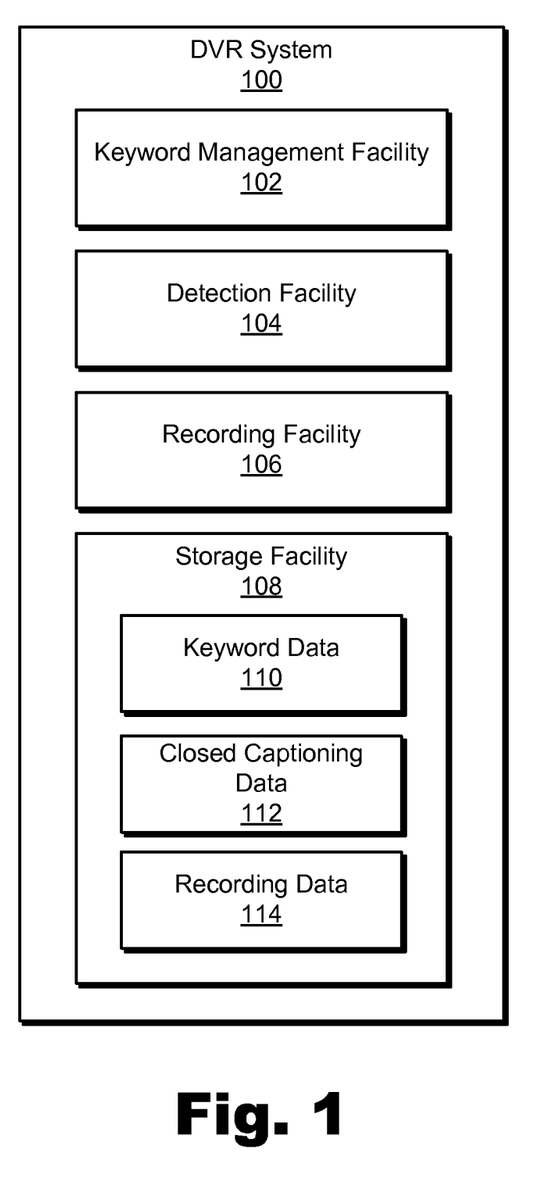
FIG. 1 illustrates an exemplary digital video recording ("DVR") system according to principles described herein.

FIG. 1 illustrates an exemplary DVR system 100 ("system 100"). As shown, system 100 may include, without limitation, a keyword management facility 102, a detection facility 104, a recording facility 106, and a storage facility 108 selectively and communicatively coupled to one another. It will be recognized that although facilities 102-108 are shown to be separate facilities in FIG. 1, any of facilities 102-108 may be combined into fewer facilities, such as into a single facility, or divided into more facilities as may serve a particular implementation.

Keyword management facility 102 may be configured to perform one or more keyword management operations. For example, keyword management facility 102 may receive, maintain, and or otherwise manage one or more keywords provided by a user of a media content service.

Keyword management facility 102 may receive user input representative of one or more keywords in any suitable manner. For example, as will be described below, keyword management facility 102 may receive user input of one or more keywords by way of a graphical user interface ("GUI"), a messaging service (e.g., a text messaging service), an email service, a voice recognition service, and/or in any other manner as may serve a particular implementation.

Detection facility 104 may be configured to detect one or more user-provided keywords (and/or variations thereof) within closed captioning content associated with a media content instance available for access by the user by way of the media content service. As used herein, "closed captioning content" associated with a media content instance refers to a transcript of an audio portion of the media content instance (e.g., a transcript of the speech and/or non-speech elements of the media content instance). In some examples, closed captioning content associated with a media content instance may be temporally synchronized with the media content instance. In other words, each particular portion of the transcript temporally corresponds to a particular portion of the media content instance.

Closed captioning content may be in the form of a closed captioning stream or feed that is provided along with a media content stream (e.g., a media content stream comprising a live broadcast television program), a closed captioning data file associated with a media content instance (e.g., a pre-recorded television program), and/or in any other form as may serve a particular implementation. Hence, detection facility 104 may detect a keyword within closed captioning content by identifying the key word in a closed captioning stream or feed associated with the media content instance and/or within a closed captioning data file associated with the media content instance.

Detection facility 104 may detect one or more user-provided keywords within closed captioning content in any suitable manner. For example, if the user has provided multiple keywords, detection facility 104 may detect the keywords within closed captioning content associated with a media content instance by identifying a plurality of temporal positions within the media content instance that correspond to the plurality of keywords and determining that the identified temporal positions are each included within a predetermined time period. To illustrate, detection facility 104 may determine that first and second keywords are included in closed captioning content associated with a media content instance only if the first and second keywords occur within thirty seconds (or any other predetermined amount of time) of each other within the media content instance.

Additionally or alternatively, detection facility 104 may detect that multiple keywords are included within closed captioning content by determining that the plurality of keywords are positioned within a predetermined number of words of each other within the closed captioning content. For example, detection facility 104 may determine that first and second keywords are included in closed captioning content only if the first and second keywords are positioned within ten words (or any other number of words) of each other within the closed captioning content.

In some examples, detection facility 104 may be configured to facilitate creation by a user of one or more filter rules configured to govern an operation of detection facility 104. For example, a user may specify that detection facility 104 only monitor closed captioning content associated with media content instances provided by way of a particular channel. Other exemplary filter rules will be described in more detail below.

Recording facility 106 may be configured to perform one or more recording operations with respect to a media content instance in response to detection facility 104 detecting one or more keywords within closed captioning content associated with the media content instance. For example, recording facility 106 may provide a recorded version of the media content instance for access by the user, provide a recorded segment of the media content instance for access by the user, provide a notification associated with the media content instance to the user (e.g., a prompt to initiate recording of the media content instance), and/or perform any other recording operation with respect to the media content instance in response to detection facility 104 detecting one or more keywords within closed captioning content associated with the media content instance as may serve a particular implementation. Examples of some of these recording operations will be described in more detail below.

In some examples, recording facility 106 may be further configured to detect a playback of a recorded version of a media content instance that was identified as being related to one or more keywords provided by a user. As will be described in more detail below, recording facility 106 may provide a transcript including the one or more keywords for presentation to the user during the playback, detect a selection by the user of a keyword included in the transcript of one or more keywords, and automatically cause the playback to skip to a temporal location corresponding to the selected keyword.

Storage facility 108 may be configured to maintain keyword data 110 generated and/or used by keyword management facility 102, closed captioning data 112 representative of closed captioning content associated with one or more media content instances, and/or recording data 114 generated and/or used by recording facility 106. It will be recognized that storage facility 108 may maintain additional or alternative data as may serve a particular implementation.

Figure 2:
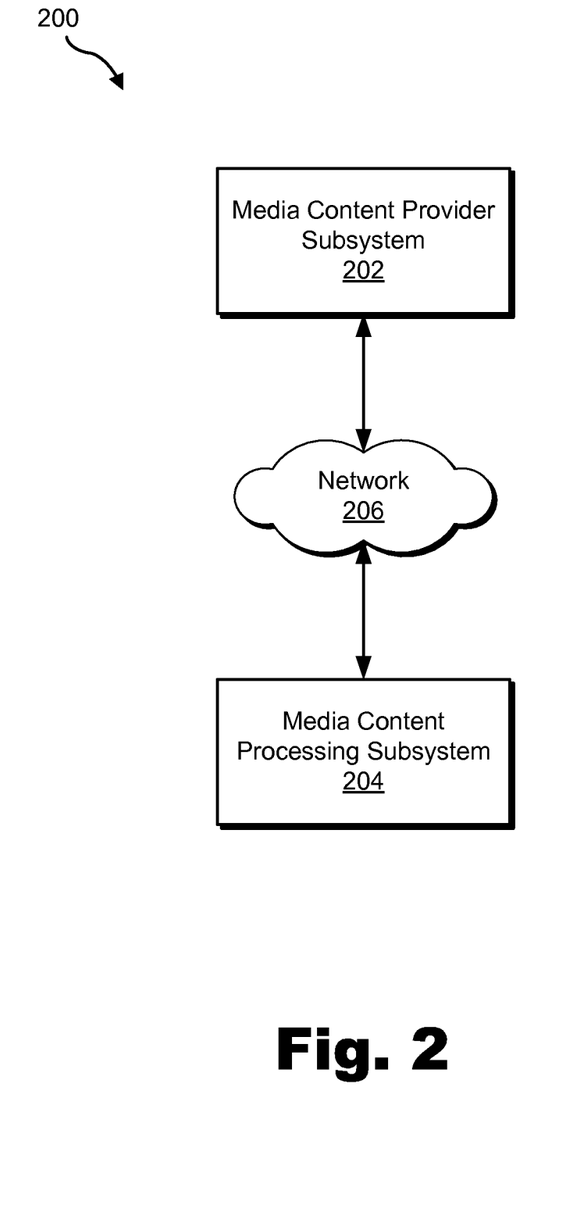
FIG. 2 illustrates an exemplary implementation of the system of FIG. 1 according to principles described herein.

FIG. 2 illustrates an exemplary implementation 200 of system 100 wherein a media content provider subsystem 202 is communicatively coupled to a media content processing subsystem 204 by way of a network 206. Keyword management facility 102, detection facility 104, recording facility 104, and storage facility 108 may each be implemented by media content provider subsystem 202 and/or media content processing subsystem 204.

Media content provider subsystem 202 may be associated with a service provider (e.g., a subscriber television service provider, an Internet service provider, a DVR service provider, etc.), a media content program provider (e.g., ESPN, NBC, etc.), and/or any other type of media content provider. Accordingly, media content provider subsystem 202 may be configured to provide one or more media content services (e.g., DVR services, television services, video-on-demand services, Internet services, application services, etc.) to media content processing subsystem 204. For example, media content provider subsystem 202 may be configured to manage (e.g., maintain, process, distribute, and/or generate) media content (e.g., media content programs, advertisements, etc.) and/or closed captioning content associated with the media content configured to be delivered to media content processing subsystem 204. Media content provider subsystem 202 may be implemented by one or more computing devices as may serve a particular implementation.

Media content processing subsystem 204 may facilitate access by a user to media content (e.g., media content programs and/or advertisements) provided by media content provider subsystem 202. For example, media content processing subsystem 204 may be configured to perform one or more recording operations at the direction of a user. To illustrate, media content processing subsystem 204 may present and/or record a media content program at the direction of a user.

Media content processing subsystem 204 may be implemented by any suitable combination of media content processing or computing devices ("processing devices"). For example, media content processing subsystem 204 may be implemented by one or more local processing devices (i.e., processing devices that the user interacts with directly such as set-top box devices, DVR devices, personal computers, mobile devices (e.g., mobile phones and/or tablet computers), personal-digital assistant devices, gaming devices, television devices, etc.) and/or one or more remote processing devices (i.e., processing devices that the user does not interact with directly such as servers, remote DVR devices, network devices, etc.). In some examples, media content processing subsystem 204 may be at least partially implemented by one or more processing devices associated with and/or maintained by a media content provider. For example, media content processing subsystem 204 may be at least partially implemented by a network DVR device configured to be located at a premises maintained by the media content provider.

Media content provider subsystem 202 and media content processing subsystem 204 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Media content provider subsystem 202 and media content processing subsystem 204 may communicate using any suitable network. For example, as shown in FIG. 2, media content provider subsystem 202 and media content processing subsystem 204 may be configured to communicate with each other by way of network 206. Network 206 may include one or more networks or types of networks capable of carrying communications and/or data signals between media content provider subsystem 202 and media content processing subsystem 204. For example, network 206 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

In certain embodiments, system 100 may be implemented entirely by media content provider subsystem 202 or by media content processing subsystem 204. In other embodiments, components of system 100 may be distributed across media content provider subsystem 202 and media content processing subsystem 204.

Figure 3:
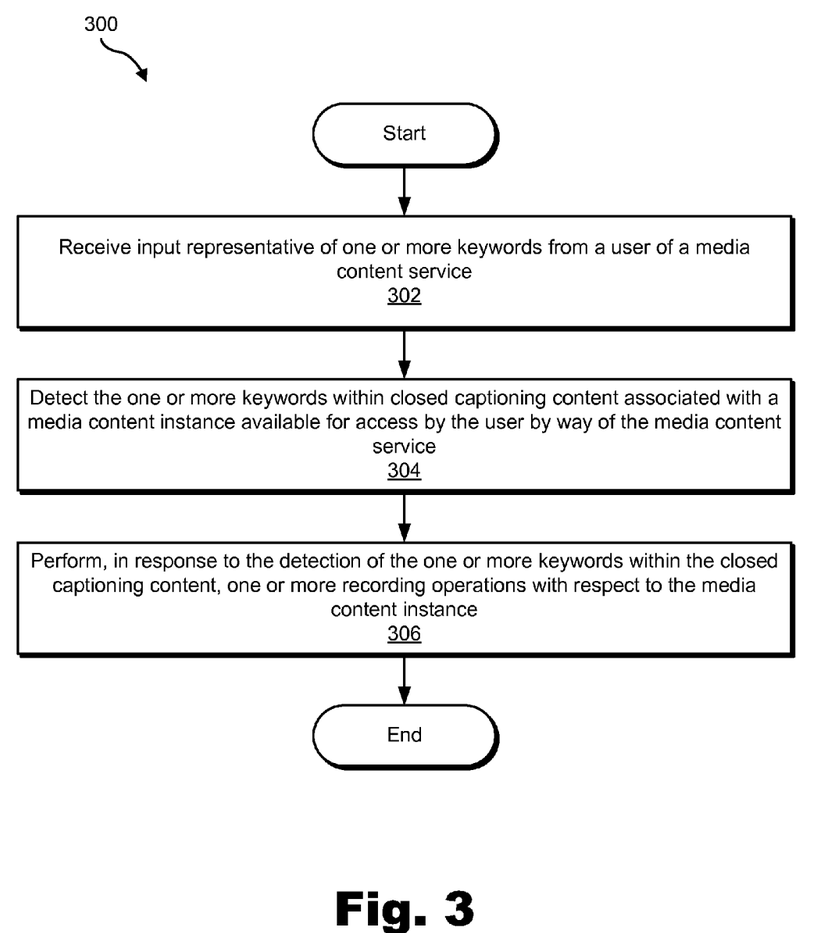
FIG. 3 illustrates an exemplary closed captioning content based digital video recording method according to principles described herein.

FIG. 3 illustrates an exemplary closed captioning content based digital video recording method 300. While FIG. 3 illustrates exemplary steps according to one embodiment, other embodiments may omit, add to, reorder, and/or modify any of the steps shown in FIG. 3. One or more of the steps shown in FIG. 3 may be performed by system 100 and/or any implementation thereof.

In step 302, a DVR system receives input representative of one or more keywords from a user of a media content service. Step 302 may be performed in any of the ways described herein.

In step 304, the DVR system detects the one or more keywords within closed captioning content associated with a media content instance available for access by the user by way of the media content service. Step 304 may be performed in any of the ways described herein.

In step 306, the DVR system performs, in response to the detection of the one or more keywords within the closed captioning content, one or more recording operations with respect to the media content instance. Step 306 may be performed in any of the ways described herein.

Various implementations of system 100 and method 300 will now be described. It will be recognized that the implementations described herein are merely illustrative of the many different implementations that may be realized in connection with the methods and systems described herein.

Figure 4:
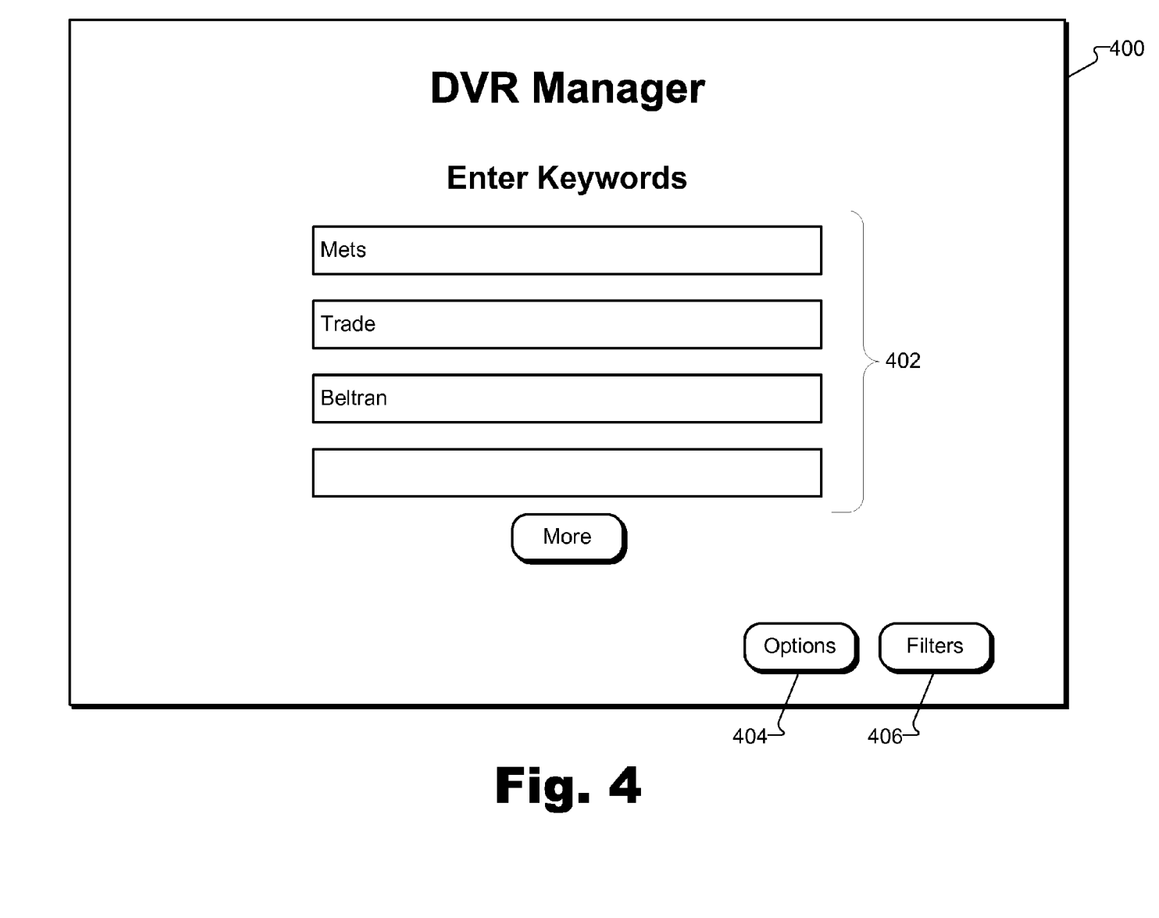
FIG. 4 shows an exemplary graphical user interface ("GUI") that may be provided to facilitate input of one or more keywords by a user of a media content service according to principles described herein.

FIG. 4 shows an exemplary GUI 400 that may be provided by system 100 to facilitate input of one or more keywords by a user of a media content service. As shown, GUI 400 may include a plurality of text input fields 402 into which the user may input one or more keywords. In the example of FIG. 4, the user has input the keywords "Mets," "Trade," and "Beltran" into fields 402. In response, as will be described below, system 100 may search for an occurrence of each of these keywords in closed captioning content associated with one or more media content instances available to the user by way of the media content service and automatically perform one or more recording operations associated with one or more media content instances associated with closed captioning content that includes the keywords.

GUI 400 may be presented by way of any suitable media content processing device associated with the user. For example, GUI 400 may be presented by way of a set-top box device used by the user to access media content. Additionally or alternatively, GUI 400 may be presented by way of a mobile device (e.g., a mobile phone) associated with the user. In this manner, the user may provide the one or more keywords even if he or she is away from his or her set-top box device.

For example, the user may be traveling and learn about a particular news event that interests the user. The user may access GUI 400 (e.g., by way of mobile device executing a mobile application associated with the media content service, etc.) and provide one or more keywords associated with the news event. System 100 may then provide recorded media content related to the one or more keywords for access by the user by way of the mobile device and/or by way of the set-top box device when the user returns home.

It will be recognized that GUI 400 is merely illustrative of the many different ways system 100 may receive input representative of one or more keywords from a user. In additional or alternative examples, the user may transmit the keywords to system 100 by way of a text message, an email message, a voice command, etc.

In some examples, GUI 400 may include an "options" button 404 that may be selected by a user to specify one or more options associated with an operation of system 100. For example, a user may specify an amount of time within which the keywords entered into fields 402 must occur in closed captioning content associated with a particular media content instance in order to be detected, one or more custom recording options (e.g., the user may select button 404 to specify a manner in which system 100 notifies the user when a particular media content instance associated with closed captioning content that includes the keywords entered into fields 402 is detected, one or more segment lengths, etc.), an amount of time system 100 is to monitor closed captioning content for a particular set of keywords (e.g., one day or one week), and/or any other option associated with an operation of system 100. It will be recognized that these and other options may be alternatively specified by a user in any other manner.

GUI 400 may also include a "filters" option 406 that may be selected by a user to create one or more filter rules configured to govern an operation of detection facility 104. For example, a user may specify that detection facility 104 only monitor closed captioning content associated with media content instances provided by way of a particular channel.

In some examples, a filter rule may be based on one or more metadata values associated with media content instances available by way of the media content service. To illustrate, a user may specify that the system 100 only monitor closed captioning content associated with news programs or other specific types of media content (e.g., news programs, movies, videos on demand, sports programming, etc.). Additionally or alternatively, a user may specify that the system 100 only monitor closed captioning content associated with media content instances having a particular genre (e.g., action, romance, etc.), featuring specific personnel (e.g., actors, producers, directors, etc.), having a particular video quality (e.g., high definition), and/or having any other attribute that may be specified by metadata.

In cases where there are multiple keywords, such as in the example of FIG. 4, system 100 may be required to identify an occurrence of each of the keywords within a particular time period associated with a media content instance before performing one or more operations with respect to the media content instance. This time period may be specified by the user, as described above, or automatically determined by system 100. For example, system 100 may be required to identify an occurrence of each of the keywords within a thirty second time period. This may be performed in any suitable manner.

For example, system 100 may identify a temporal position within the media content instance that corresponds to each of the keywords. System 100 may then determine that each of the temporal positions associated with the keywords is included within a predetermined time period. A temporal position corresponding to a particular keyword may be determined in any suitable manner. For example, a media content instance and its corresponding closed captioning content may be concurrently transmitted by way of a media content stream and a closed captioning stream, respectively. System 100 may monitor the closed captioning stream and detect a particular point in time within the presentation of the media content instance at which the keyword occurs (e.g., a point in time at which the keyword arrives at media content processing subsystem 204). System 100 may then designate this particular point in time as a temporal position of the keyword.

It will be recognized that system 100 may determine a temporal position of a keyword in any other manner as may serve a particular implementation. For example, if the closed captioning content is included in a closed captioning data file associated with a pre-recorded media content instance, each word included in the closed captioning content may have a timestamp associated therewith. The timestamp data may be used to identify a temporal position within the media content instance that corresponds to a particular keyword.

Figure 5:
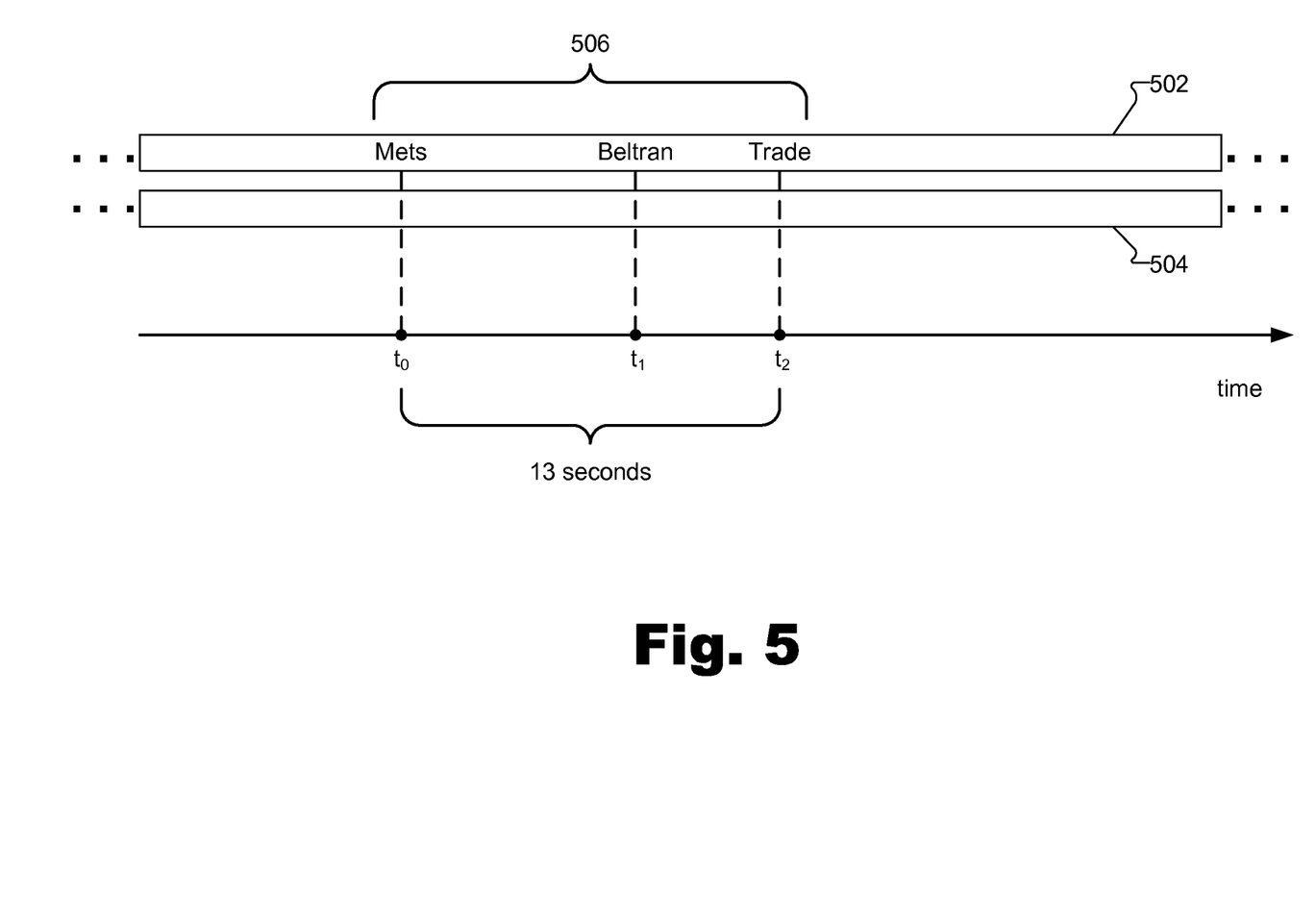
FIGS. 5-6 illustrate an exemplary detection of keywords within closed captioning content associated with a media content instance according to principles described herein.

FIG. 5 illustrates an exemplary detection of the keywords input into GUI 400 within closed captioning content 502 associated with a media content instance 504. As shown, media content instance 504 and closed captioning content 502 are temporally aligned along a time axis. In other words, as media content instance 504 is transmitted for presentation by way of one or more media content processing devices, temporally aligned closed captioning content is also transmitted for presentation by way of the one or more media content processing devices. In the example of FIG. 5, system 100 detects an occurrence of the keyword "Mets" at time $t_0$, an occurrence of the keyword "Beltran" at time $t_1$, and an occurrence of the keyword "Trade" at time $t_2$. For illustrative purpose, these keywords will be referred to herein as "keywords 506". As indicated by the vertical dashed lines, the times at which keywords 506 occur (i.e., times $t_0$, $t_1$, and $t_2$) each correspond to a particular temporal position within media content instance 504.

As shown, the temporal positions associated with times $t_0$, $t_1$, and $t_2$ are within a thirteen second time period. If this time period is less than a predetermined amount of time (e.g., thirty seconds), system 100 may perform one or more recording operations with respect to media content instance 504. Exemplary recording operations that may be performed by system with respect to media content instance 504 will now be described.

In some examples, system 100 may perform a recording operation with respect to media content instance 504 by providing a recorded version of the entire media content instance 504 for access by the user. This may be performed in any suitable manner. For example, system 100 may direct a local DVR device associated with the user to begin recording media content instance 504 upon detection of keywords 506 within closed captioning content 502. A remaining unrecorded portion of media content instance 504 (e.g., a portion of media content instance 504 that precedes an occurrence of keywords 506 within closed captioning content 502) may be provided to the local DVR device by system 100 in any suitable manner. For example, system 100 may direct a remote DVR device (e.g., a DVR device maintained by a service provider and/or a DVR device associated with another user) to transmit the unrecorded portion of media content instance 504 to the local DVR device.

In some examples, system 100 may record or otherwise have access to recorded versions of each media content instance available to a user by way of a media content service.

For example, system 100 may maintain a library of recorded media content instances, which may include media content instance 504. Upon detection of keywords 506 within closed captioning content 502, system 100 may provide a media content processing device (e.g., a set-top box device) associated with the user with access to the recorded version of media content instance 504 within the library of recorded media content instances.

When providing a recorded version of the entire media content instance 504 for access by a user, system 100 may be configured to omit (e.g., not record) one or more advertisements presented in conjunction with media content instance 504. Alternatively, system 100 may record the one or more advertisements presented in conjunction with media content instance 504 so that the one or more advertisements may also be presented to the user when the user accesses the recorded version of media content instance 504.

Additionally or alternatively, system 100 may perform a recording operation with respect to media content instance 504 by providing a recorded segment (e.g., a recorded portion of media content instance 504 that mentions keywords 506) of media content instance 504 for access by the user. Providing segmented access to a user may be particularly beneficial for news programs and other types of media content instances that present information covering a number of unrelated topics. System 100 may provide a recorded segment of media content instance 504 for access by the user in any suitable manner.

For example, the recorded segment may be defined by a first temporal position within media content instance 504 that temporally precedes the temporal positions associated with keywords 506 by a first predetermined amount of time and a second temporal position within media content instance 504 that temporally follows the temporal positions associated with keywords 506 by a second predetermined amount of time. These amounts of time may be specified by a user and/or automatically determined by system 100.

To illustrate, a user may specify that the first temporal position (i.e., the beginning of the segment) is to be ten seconds (or any other amount of time) prior to an occurrence of the first keyword 506 detected in closed captioning content 502 (i.e., the keyword "Mets" at time $t_0$). Likewise, the user may specify that the second temporal position (i.e., the end of the segment) is to be sixty seconds (or any other amount of time) after an occurrence of the last keyword 506 detected in closed captioning content 502 (i.e., the keyword "Trade" at time $t_2$).

Figure 6:
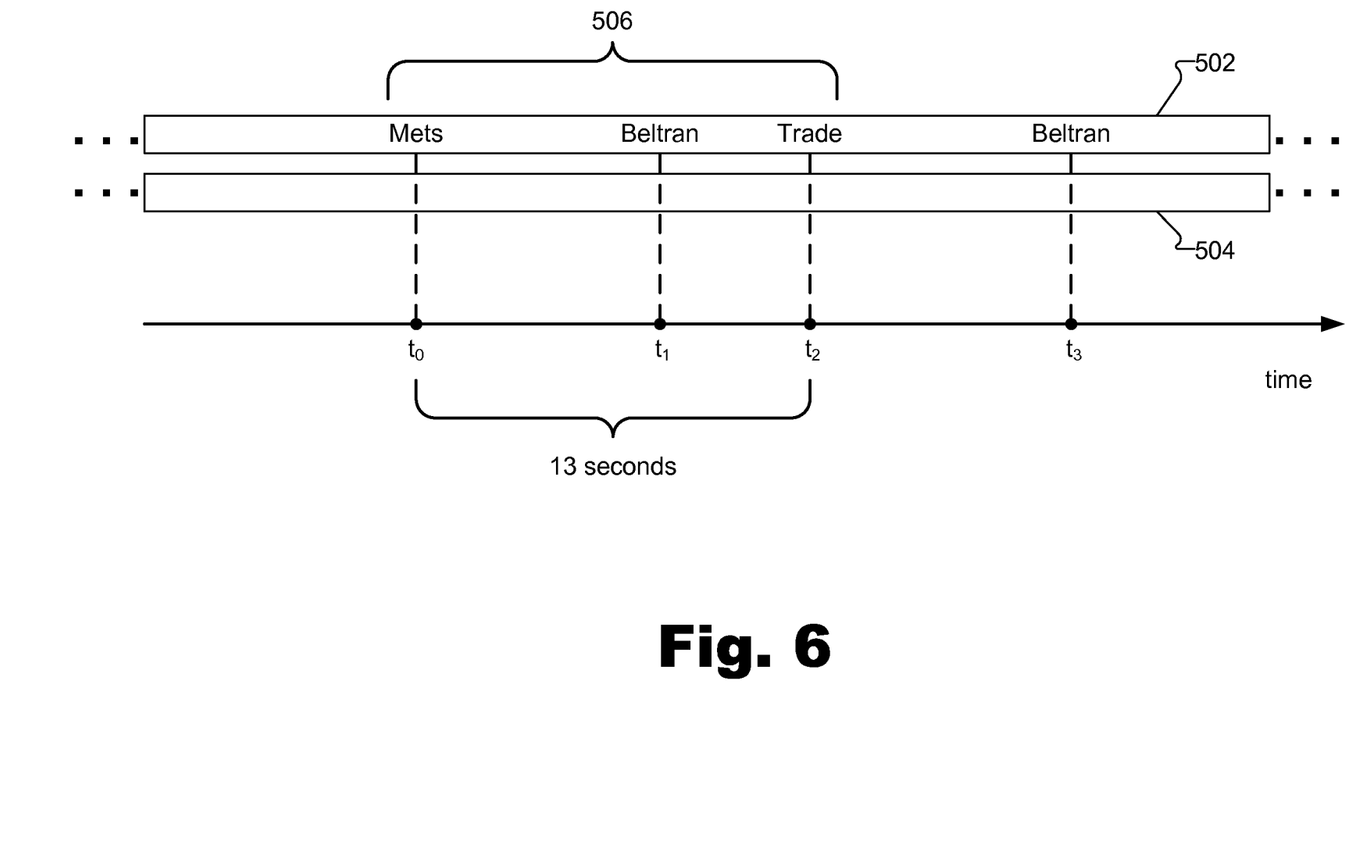

Continuing with this example, system 100 may detect another occurrence of one of keywords 506 within closed captioning content 502 subsequent to the occurrence of the last keyword 506 (i.e., the keyword "Trade" at time $t_2$). For example, FIG. 6 shows that system 100 may detect another occurrence of the keyword "Beltran" at time $t_3$, which is subsequent to time $t_2$. In this case, system 100 may automatically extend the end time of the segment to be provided for access by the user to be sixty seconds (or any other amount of time) after the occurrence of the keyword "Beltran" at time $t_3$.

In some alternative embodiments, the first temporal position associated with the segment (i.e., the beginning of the segment) may be defined to correspond to a beginning time of media content instance 504. Likewise, the second temporal position associated with the segment (i.e., the end of the segment) may be defined to correspond to an ending time of media content instance 504. In this manner, system 100 may use the beginning and ending times of media content instance 504 to prevent a recorded version of media content instance 504 from extending beyond the start and/or end of media content instance 504. Accordingly, system 100 may prevent providing the user with a recorded version of media content that temporally precedes or follows a presentation of media content instance 504.

Additionally or alternatively, system 100 may perform a recording operation with respect to media content instance 504 by providing a notification associated with media content instance 504 to the user. This may be performed in any of a number of different ways.

Figure 7:
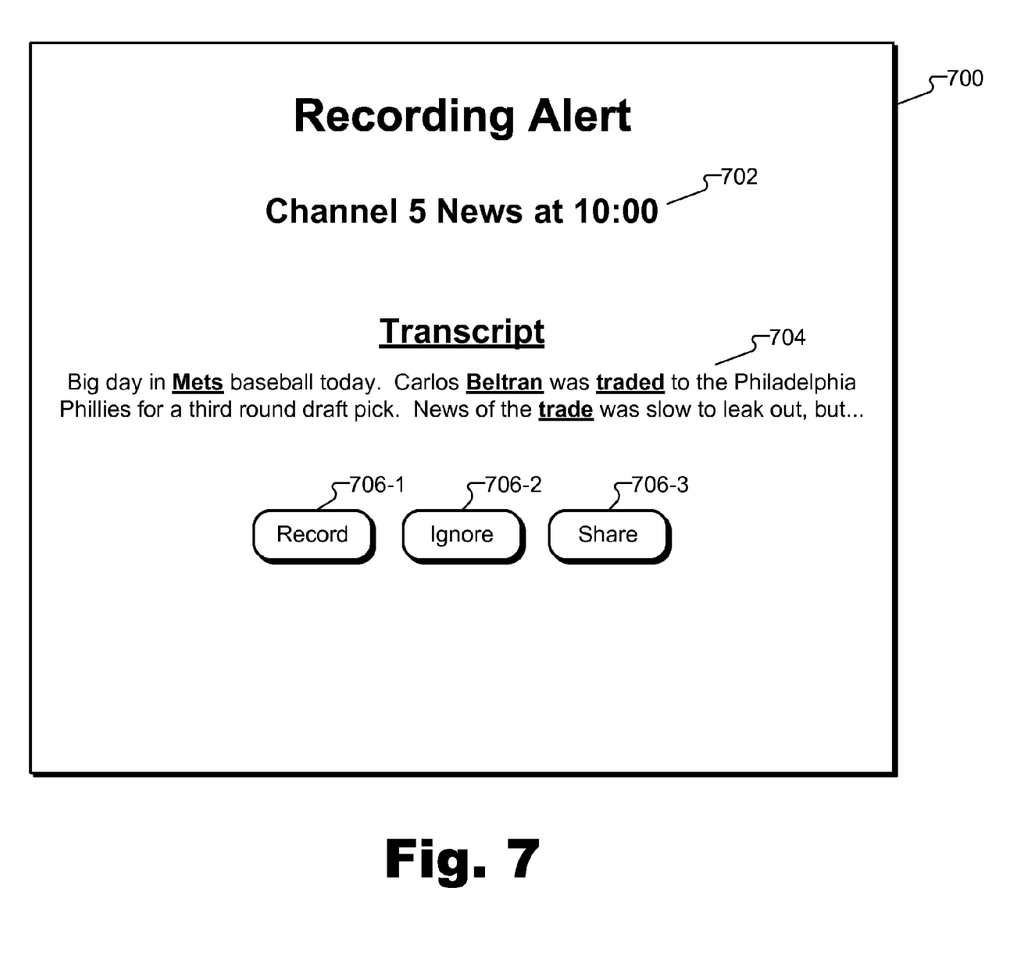
FIG. 7 illustrates an exemplary notification that may be provided to a user in response to keywords being detected within closed captioning content according to principles described herein.

To illustrate, FIG. 7 illustrates an exemplary notification 700 that may be provided to the user in response to keywords 506 being detected within closed captioning content 502. Notification 700 may be transmitted to a mobile device or to any other suitable media content processing device associated with the user and configured to process and display notification 700. It will be recognized that notification 700 is merely illustrative of the many different types of notifications that may be provided by system 100 to a user in response to keywords being detected in closed captioning content associated with a particular media content instance.

As shown, notification 700 may include identifying information 702 associated with media content instance 504 (e.g., the title of the media content instance 504, the name of the channel carrying media content instance 504, and/or any other identifying information associated with media content instance 504), a transcript 704 of a portion of media content instance 504 that is temporally associated with keywords 506, and one or more selectable options 706 (e.g., options 706-1 through 706-3) associated with media content instance 504. Notification 700 may allow a user to view identifying information 702 and/or transcript 704 associated with media content instance 504 and readily determine whether he or she desires to take any action with respect to media content instance 504 by selecting one or more of selectable options 706. For example, the user may select option 706-1 to direct system 100 to record at least a portion of media content instance 504 (e.g., by providing a recorded version of media content instance 504 to a local DVR device associated with the user), option 706-2 to ignore media content instance 504 (e.g., by preventing system 100 from providing the user with access to a recorded version of media content instance 504), or option 706-3 to share media content instance 504 with one or more friends or other users (e.g., by providing the one or more friends or other users with a recorded version of media content instance 504).

Additionally or alternatively, system 100 may perform a recording operation with respect to media content instance 504 by replacing a previously recorded media content instance associated with keywords 506 in a DVR cache with a recorded version of media content instance 504. For example, a user may only be interested in the latest news covering a potential trade made by a baseball team named the "New York Mets" for a player named "Carlos Beltran". To this end, the user may direct system 100 to replace "old news" (i.e., previously recorded media content related to keywords 506) with "new news" (i.e., recently recorded media content related to keywords 506). It will be recognized that the user may direct system 100 to save any number of recorded media content instances associated with a set of keywords as may serve a particular implementation.

In some examples, system 100 may be configured to provide a transcript associated with a media content instance for access by a user together with the media content instance. The transcript may be generated based on the closed captioning content associated with the media content instance. In some examples, one or more words (e.g., the keywords specified by the user) may be linked (e.g., hyperlinked) to corresponding temporal locations within the media content instance. In this manner, a user may select a linked word to cause a playback of the media content instance to skip to a temporal location within the media content instance that corresponds to the selected word.

Figure 8:
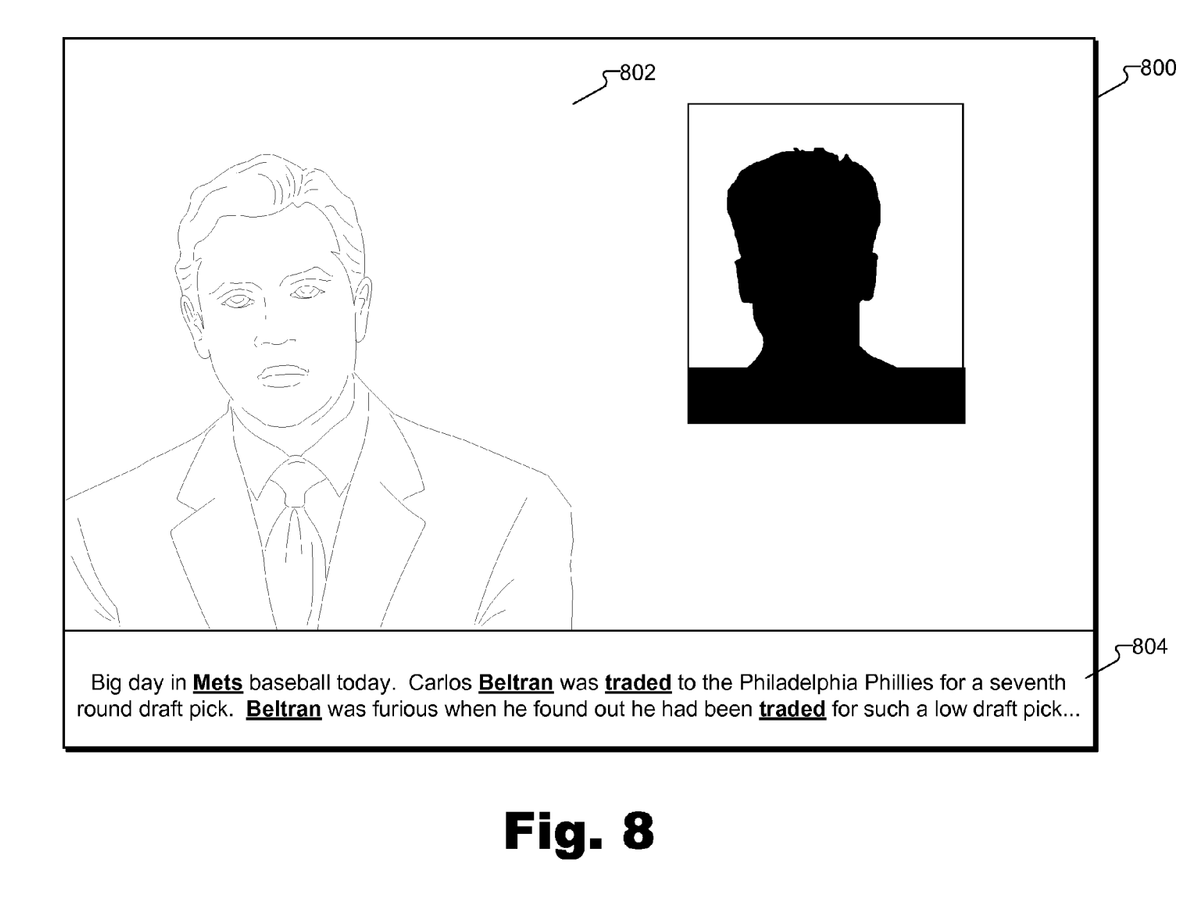
FIG. 8 shows an exemplary display screen by which a playback of a recorded version of media content instance may be presented according to principles described herein.

To illustrate, FIG. 8 shows an exemplary display screen 800 by which system 100 may present a playback 802 of a recorded version of media content instance 504. As shown, system 100 may also present a transcript 804 of media content instance 504 together with playback 802. In some examples, at least some of the words included in transcript 804 may be linked to corresponding temporal positions within media content instance 504. For example, FIG. 8 shows that the keywords (and variations thereof) are bolded and underlined, thereby signifying that they may be selected to cause playback 802 to automatically skip to corresponding temporal positions within media content instance 504. This may allow a user to more effectively locate and access a portion of media content instance 504 that may be of particular interest to the user.

Figure 9:
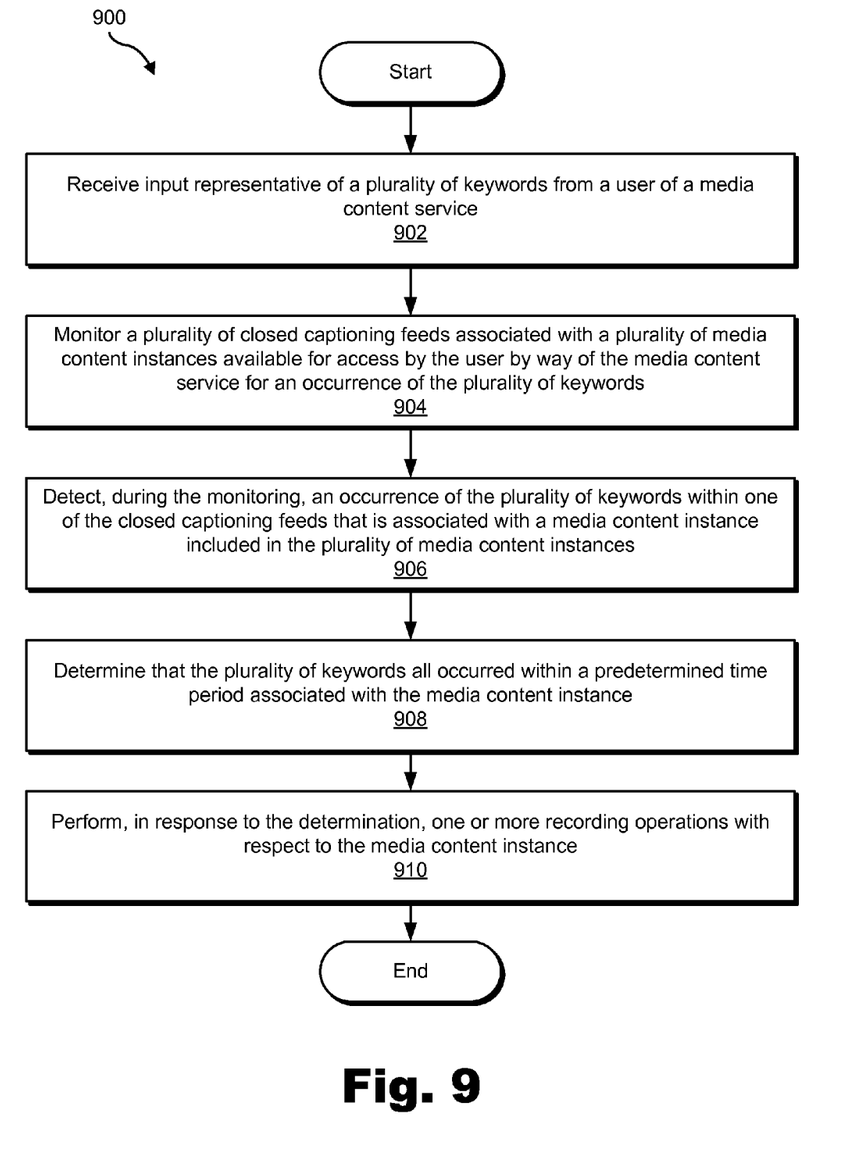
FIG. 9 illustrates another exemplary closed captioning content based digital video recording method according to principles described herein.

FIG. 9 illustrates another exemplary closed captioning content based digital video recording method 900. While FIG. 9 illustrates exemplary steps according to one embodiment, other embodiments may omit, add to, reorder, and/or modify any of the steps shown in FIG. 9. One or more of the steps shown in FIG. 9 may be performed by system 100 and/or any implementation thereof.

In step 902, a DVR system receives input representative of a plurality of keywords from a user of a media content service. Step 902 may be performed in any of the ways described herein.

In step 904, the DVR system monitors a plurality of closed captioning feeds associated with a plurality of media content instances available for access by the user by way of the media content service for an occurrence of the plurality of keywords. Step 904 may be performed in any of the ways described herein.

In step 906, the DVR system detects, during the monitoring, an occurrence of the plurality of keywords within one of the closed captioning feeds that is associated with a media content instance included in the plurality of media content instances. Step 906 may be performed in any of the ways described herein.

In step 908, the DVR system determines that the plurality of keywords all occurred within a predetermined time period associated with the media content instance. Step 908 may be performed in any of the ways described herein.

In step 910, the DVR system performs, in response to the determination, one or more recording operations with respect to the media content instance. Step 910 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 10:
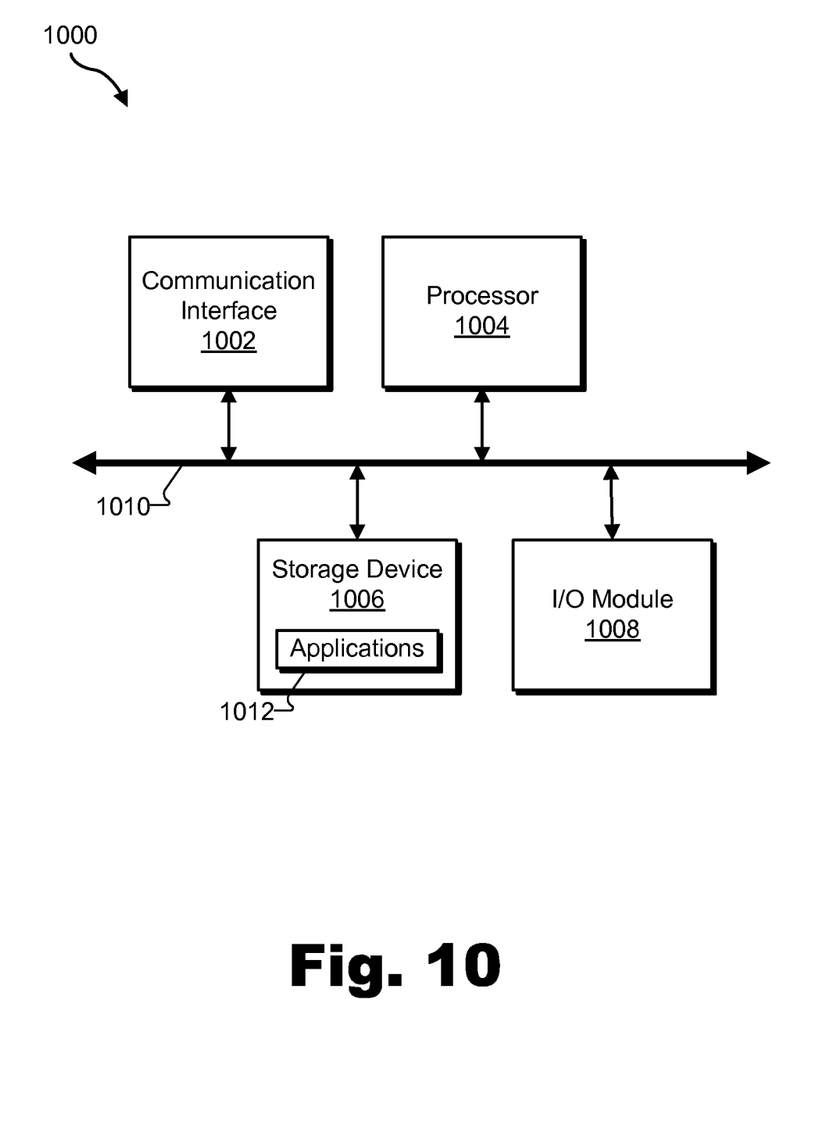
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with keyword management facility 102, detection facility 104, and/or recording facility 106. Likewise, storage facility 108 may be implemented by or within storage device 1006.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    receiving, by a digital video recording ("DVR") system, input representative of at least a first keyword and a second keyword from a user of a media content service;
    detecting, by the DVR system, the first keyword and the second keyword within closed captioning content associated with a media content instance available for access by the user by way of the media content service;
    identifying, by the DVR system within the media content instance, a first temporal position corresponding to the first keyword and a second temporal position corresponding to the second keyword;
    determining, by the DVR system, that:
        the first temporal position is separated from the second temporal position by less than a predetermined amount of time within the media content instance, or
        the first keyword is separated from the second keyword by less than a predetermined number of words within the closed captioning content; and
    performing, by the DVR system in response to the determining, one or more recording operations with respect to the media content instance.

2. The method of claim 1, wherein the receiving of the input representative of the first keyword and the second keyword comprises receiving the input by way of at least one of a graphical user interface, a messaging service, an email service, and a voice recognition service.

3. The method of claim 1, wherein the detecting of the first keyword and the second keyword within the closed captioning content comprises identifying the plurality of keywords in a closed captioning stream associated with the media content instance.

4. The method of claim 1, wherein the detecting of the first keyword and the second keyword within the closed captioning content comprises identifying the first keyword and the second keyword in a closed captioning data file associated with the media content instance.

5. The method of claim 1, wherein the performing of the one or more recording operations with respect to the media content instance comprises providing a recorded version of the media content instance for access by the user.

6. The method of claim 5, wherein the recorded version of the media content instance includes one or more advertisements presented in conjunction with the media content instance.

7. The method of claim 5, further comprising:
    detecting, by the DVR system, a playback of the recorded version of the media content instance;
    providing, by the DVR system, a transcript including the first keyword and the second keyword for presentation to the user during the playback;
    detecting, by the DVR system, a selection by the user of the first keyword or the second keyword; and
    automatically causing, by the DVR system, the playback to skip to a temporal location corresponding to the selected keyword.

8. The method of claim 1, wherein the performing of the one or more recording operations with respect to the media content instance comprises providing a recorded segment of the media content instance for access by the user.

9. The method of claim 8, wherein the recorded segment comprises a portion of the media content instance defined by a third temporal position within the media content instance that temporally precedes the first temporal position and the second temporal position and a fourth temporal position that temporally follows the first temporal position and the second temporal position.

10. The method of claim 9, wherein the third temporal position temporally precedes the first temporal position and the second temporal position by a first predetermined amount of time and the fourth temporal position temporally follows the first temporal position and the second temporal position by a second predetermined amount of time.

11. The method of claim 9, wherein the first temporal position corresponds to a beginning time of the media content instance.

12. The method of claim 9, wherein the second temporal position corresponds to an ending time of the media content instance.

13. The method of claim 8, wherein the performing of the one or more recording operations further comprises providing a transcript associated with the recorded segment for access by the user together with the recorded segment.

14. The method of claim 1, wherein the performing of the one or more recording operations with respect to the media content instance comprises providing a notification associated with the media content instance to the user.

15. The method of claim 14, wherein the providing of the notification associated with the media content instance to the user comprises transmitting the notification to a mobile device associated with the user.

16. The method of claim 14, wherein the notification comprises at least one of identifying information associated with the media content instance, a transcript of a portion of the media content instance that is temporally associated with the first keyword and the second keyword, and one or more selectable options associated with the media content instance.

17. The method of claim 1, wherein the performing of the one or more recording operations with respect to the media content instance comprises directing a local DVR device associated with the user to record at least a portion of the media content instance.

18. The method of claim 1, wherein the performing of the one or more recording operations with respect to the media content instance comprises replacing a previously recorded media content instance associated with the first keyword and the second keyword in a DVR cache with a recorded version of the media content instance.

19. The method of claim 1, wherein the method further comprises:
   facilitating, by the DVR system, creation by the user of one or more filter rules;
   wherein the detecting of the first keyword and the second keyword is performed in accordance with the one or more filter rules.

20. The method of claim 19, wherein the one or more filter rules are based on one or more metadata values associated with the media content instance.

21. The method of claim 1, embodied as computer-executable instructions on at least one non-transitory computer-readable medium.

22. The method of claim 1, further comprising:
   determining, by the DVR system, at least one of:
      an amount of time within the media content instance separating the first temporal position and the second temporal position, and
      a number of words positioned within the closed captioning content between the first keyword and the second keyword.

23. A system comprising:
   a keyword management facility configured to receive input representative of a first keyword and a second keyword from a user of a media content service;
   a detection facility communicatively coupled to the keyword management facility and configured to
      detect the first keyword and the second keyword within closed captioning content associated with a media content instance available for access by the user by way of the media content service,
      identify, within the media content instance, a first temporal position corresponding to the first keyword and a second temporal position corresponding to the second keyword, and
      determine that
         the first temporal position is separated from the second temporal position by less than a predetermined amount of time within the media content instance, or
         the first keyword is separated from the second keyword by less than a predetermined number of words within the closed captioning content; and
   a digital video recording ("DVR") facility communicatively coupled to the detection facility and configured to perform one or more recording operations with respect to the media content instance in response to the determination that
      the first temporal position is separated from the second temporal position by less than the predetermined amount of time within the media content instance, or
      the first keyword is separated from the second keyword by less than the predetermined number of words within the closed captioning content.

\* \* \* \* \*